Figure 1:
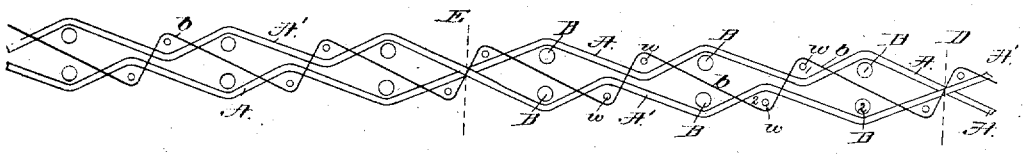

G. CROMPTON.

WOVEN FABRIC.

No. 10,743.

Reissued July 6, 1886.

Witnesses
Thos. L. Emery
John F. C. Reinhart

Inventor
George Crompton,
by Crosby & Gregory
attys.

UNITED STATES PATENT OFFICE.

GEORGE CROMPTON, OF WORCESTER, MASSACHUSETTS.

WOVEN FABRIC.

SPECIFICATION forming part of Reissued Letters Patent No. 10,743, dated July 6, 1886.

Original No. 335,567, dated February 9, 1886. Application for reissue filed May 17, 1886. (Serial No. 202,458.)

*To all whom it may concern:*

Be it known that I, GEORGE CROMPTON, of Worcester, county of Worcester, and State of Massachusetts, have invented an Improvement in Woven Fabrics, of which the following description, in connection with the accompanying drawings, is a specification, like letters on the drawings representing like parts.

This invention has for its object to produce a cheap, strong, firm, and durable double-faced carpet fabric, wherein the figure at each side the fabric is derived from face-warps operated, it may be, by two harness-frames, or by the usual harness of an ordinary Jacquard loom, the said face-warps appearing at one and then at the other side of the fabric for one or more picks. The face-warps have co-operating with them binder-warps, there being preferably one thread of binder-warp to every two or more threads of face-warp, the said face-warps and binder-warps being caught and held together by stuffer or cord weft and binder-weft. The binder-weft at alternate picks passes above all the face-warps and then below all the face-warps, the binder-weft being tied to the upper and then to the lower side of the face-warps by the binder-warps, two picks of binder-weft and two picks of stuffer or cord weft being put in in succession, the binder-warps being lifted into the upper half of the shed between the insertion of the first and second shots of stuffer or cord weft, the binder-warps thus splitting the stuffer or cord weft, the crossing of the warps and wefts being such, substantially as described, as to enable the two shots of stuffer or cord weft, when beat up into the shed, to lie one substantially over the other, forming ribs substantially opposite each other at opposite faces of the fabric, instead of leaving the rib on one side opposite the space or groove at the other side and in line with the binder-weft, the binder-wefts occupying a similar position opposite each other and between the cord-weft when beat into the shed, the fabric thus made showing permanently at each side loops of face-warps filled with a stuffer or cord weft, the large and more expensive face-warps being tied down closely at each side the large stuffer or cord weft, making a strong, firm, durable fabric.

My invention consists, essentially, in a double-faced fabric made substantially as will be hereinafter described, and composed of face-warps and binder-warps, the warps from the two surfaces being alternated, that from the lower surface passing to the upper surface, and vice versa, the said face-warps receiving in each shed made between them two shots of stuffer or cord weft, and being tied together about the said stuffer or cord wefts by fine binder-weft, the stuffer or cord weft being split by the binder-warps in each shed made in the face-warps.

Figure 2:
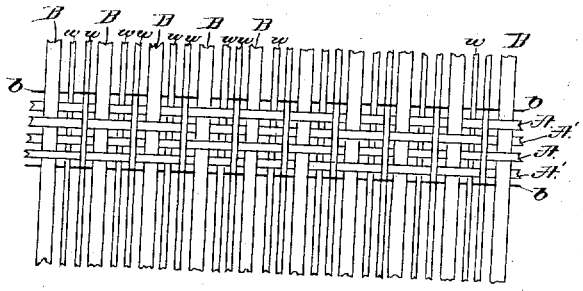

Figure 1 represents a longitudinal section of a piece of fabric embodying my invention; Fig. 2, a diagram representing the arrangement of the warp and weft threads in the fabric, and Fig. 3 a longitudinal section of the fabric as it will appear when beat up closely.

Figure 3:
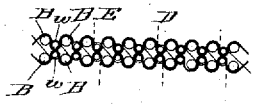

The threads shown in Figs. 1 and 2 are separated to avoid confusion; but in the actual fabric the said threads will all be beat closely together by the reed, and substantially as in Fig. 3.

To produce the carpet herein described, I make use of an ordinary two shuttle loom, well known in the art to which my invention relates, with the addition of instrumentalities for controlling the binder-warps, and also for raising and lowering at stated periods, as herein set forth, all of the face-warps.

For the binder-warps an independent set of harness is provided, the same being operated, through any of the well-known intermediaries used for like purposes, from a cam on the picker-shaft.

Instead of employing harness-frames for moving the face-warps A A′ in the formation of the sheds for the reception of the weft, I may employ for such purpose the harnesses of a Jacquard mechanism or loom of any usual construction, the Jacquard harness preferably being employed when the face-warps are to be separated for the reception of the stuffer or cord weft for figured patterns.

The sheds for the binder-wefts *w* are formed by the binder-warps on the one hand and by all the face-warps on the other hand.

The face-warps A A′, preferably of wool and of different colors, and dyed or printed according to colors and patterns as it is desired the carpet shall show, will be manipulated by two harness-frames of usual construction, or by a Jacquard harness mechanism or apparatus as usually employed for figure-weaving, so as to split the face-warps at suitable intervals to form sheds for the introduction of the stuffer or cord weft B B, carried by a shuttle, the face-warp threads uppermost, or at one side of the fabric, remaining at that side of the fabric for as many picks as desired, and then being carried to the other side of the fabric.

The binder-warps *b*, of fine strong thread, carried by one harness-frame, are distributed at suitable intervals between the face-warps, and are made to appear at one and at the other side or face of the fabric between each two shots of stuffer or cord weft.

The binder-weft *w* will be carried by a suitable shuttle.

Starting from the line D, Fig. 1, the face-warps are all lifted and the binder-warps left down, thus forming a shed between all the face-warps and the binder-warps to receive a shot of binder-weft *w*. Then a part—say substantially one-half—of the face-warps will be lowered by the harness, which, with the binder-warps then down, forms a shed for the reception of the pick No. 1 of stuffer or cord weft B. Then the binder-warps *b* are lifted above the half of the face-warp then remaining down, and a second shot, 2, of stuffer or cord weft B is inserted in the shed formed. Then the binder-warps are retained up and all the face-warps permitted to descend, and a shot of binder-weft *w* is inserted. Then all the face-warps are lifted, the binder-warps being permitted to descend, and a second shot (marked 2) of binder-weft *w* is thrown, and this operation is repeated until such time as it is desired that the face-warp uppermost in the last shed to receive the stuffer or cord weft be made to appear at the opposite side of the fabric.

When it is desired to make the warps at one face of the fabric show for one or more sheds at the opposite face of the fabric, the said face-warp threads are themselves bodily carried, as indicated at the line E, from the upper to the lower part of the shed, and vice versa, as will be readily understood.

By controlling or moving the face-warps A A′ by usual Jacquard harness mechanism, instead of by harness-frames, single threads of face-warp of a particular color may be shifted from one to the opposite face of the fabric.

I claim—

A double-faced fabric in which the face and binder warps are combined with stuffer or cord weft and with binder-weft, substantially in the manner hereinbefore set forth, whereby a fabric is produced with ribs on both of its faces formed by the same face-warps bent about the stuffer or cord weft, the ribs at opposite picks of the fabric being substantially opposite each other, the face-warps being bound down at each side of each stuffer or cord weft by the binder-warps and binder-weft, two picks of the latter lying between each two picks of the stuffer or cord weft, the binder-warps separating each two alternate picks of stuffer or cord weft, substantially as described.

GEORGE CROMPTON.

Witnesses:

GEO. D. PRATT,

JOHN B. SYME.